United States Patent
Cho et al.

(10) Patent No.: US 11,780,545 B2
(45) Date of Patent: Oct. 10, 2023

(54) SYSTEM FOR FRESH WATER SUPPLY USING DESALINATION VESSEL AND AUTONOMOUS NAVIGATION VESSEL

(71) Applicant: KOREA INSTITUTE OF SCIENCE AND TECHNOLOGY, Seoul (KR)

(72) Inventors: Kyungjin Cho, Seoul (KR); Seong Pil Jeong, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 402 days.

(21) Appl. No.: 17/128,209

(22) Filed: Dec. 21, 2020

(65) Prior Publication Data
US 2022/0033039 A1 Feb. 3, 2022

(30) Foreign Application Priority Data

Jul. 29, 2020 (KR) .......................... 10-2020-0094661

(51) Int. Cl.
*B63B 79/40* (2020.01)
*C02F 1/00* (2023.01)
(Continued)

(52) U.S. Cl.
CPC .............. *B63B 79/40* (2020.01); *B63J 1/00* (2013.01); *C02F 1/008* (2013.01); *G01C 21/203* (2013.01);
(Continued)

(58) Field of Classification Search
CPC ...... B63B 79/40; B63B 2035/007; B63J 1/00; C02F 1/008; C02F 2201/001;
(Continued)

(56) References Cited

U.S. PATENT DOCUMENTS

2015/0217837 A1* 8/2015 Szydlowski ............ B63B 25/12
114/74 R

FOREIGN PATENT DOCUMENTS

KR 100734814 B1 7/2007
KR 101402482 B1 6/2014
(Continued)

OTHER PUBLICATIONS

Sangho Lee et al., "Marine Mobile Desalination Plant Technology," Construction Technology Trend, Korea Institute of Civil Engineering and Building Technology, 2019, pp. 40-45, English abstract.

*Primary Examiner* — Brian P Sweeney
(74) *Attorney, Agent, or Firm* — CANTOR COLBURN LLP

(57) ABSTRACT

The present disclosure relates to a system for fresh water supply using a desalination vessel and an autonomous navigation vessel, and more particularly, to a system for fresh water supply using a desalination vessel and an autonomous navigation vessel capable of, in providing fresh water to a plurality of islands using a vessel equipped with a desalination apparatus and an autonomous navigation vessel, setting an optimal fresh water supply route in consideration of the fresh water retention status of islands, location information of islands, and fresh water requirement amount for each route, and based on this, supplying fresh water to each of the islands, thereby minimizing the operation cost of the vessels and stably providing fresh water to the islands requiring fresh water, and the system for fresh water supply using a desalination vessel.

11 Claims, 5 Drawing Sheets

(51) Int. Cl.
  *G01C 21/20* (2006.01)
  *B63J 1/00* (2006.01)
  *G06Q 10/08* (2023.01)
  *G06Q 50/30* (2012.01)
  *G06Q 10/0835* (2023.01)

(52) U.S. Cl.
  CPC ....... *G06Q 10/08355* (2013.01); *G06Q 50/30* (2013.01); *C02F 2201/001* (2013.01); *C02F 2209/008* (2013.01); *C02F 2209/42* (2013.01)

(58) Field of Classification Search
  CPC ............ C02F 2209/008; C02F 2209/42; C02F 2103/08; G01C 21/203; G06Q 10/08355; G06Q 50/30; G06Q 50/06; G05D 1/0088; G05D 1/0206
  See application file for complete search history.

(56) References Cited

FOREIGN PATENT DOCUMENTS

| | | |
|---|---|---|
| KR | 10-1655965 B1 | 9/2016 |
| KR | 10-1941896 B1 | 1/2019 |
| KR | 101963124 B1 | 4/2019 |
| KR | 20230008385 A * | 7/2021 |

\* cited by examiner

SYSTEM FOR FRESH WATER SUPPLY USING DESALINATION VESSEL AND AUTONOMOUS NAVIGATION VESSEL

CROSS-REFERENCE TO RELATED APPLICATION

This application claims priority to Korean Patent Application No. 10-2020-0094661, filed on Jul. 29, 2020, and all the benefits accruing therefrom under 35 U.S.C. § 119, the contents of which in its entirety are herein incorporated by reference.

TECHNICAL FIELD

The present disclosure relates to a system for fresh water supply using a desalination vessel and an autonomous navigation vessel, and more particularly, to a system for fresh water supply using a desalination vessel and an autonomous navigation vessel capable of, in providing fresh water to a plurality of islands using a vessel equipped with a desalination apparatus and an autonomous navigation vessel, setting an optimal fresh water supply route in consideration of the fresh water retention status of islands, location information of islands, and fresh water requirement amount for each route, and based on this, supplying fresh water to each of the islands, thereby minimizing the operation cost of the vessels and stably providing fresh water to the islands requiring fresh water.

[Description about National Research and Development Support]

This study was supported by the Desalination vessel operation and water production cost reduction technology development project of Ministry of Environment, Republic of Korea (Projects No. 146841) under Korea Environmental Industry and Technology Institute.

BACKGROUND ART

In the case of small island areas that require fresh water, small-scale desalination apparatuses are installed and operated to produce fresh water, or fresh water is provided through the supply of bottled water from the outside. In order to secure stable fresh water, a method of installing and operating a desalination apparatus is most preferable, but management of the desalination apparatus is not easy due to the nature of islands. Considering that the installation and operation of the desalination apparatus requires considerable costs, it can be seen that it is advantageous in terms of cost to provide fresh water from an external vessel or the like.

The most common method of providing fresh water to island areas is to supply bottled water through vessels and the like, and recently, a method of producing fresh water through a vessel equipped with a desalination apparatus and supplying the produced fresh water to each island is considered. Fresh water can be supplied to each island through the vessel equipped with the desalination apparatus according to the need or request of each island.

In supplying fresh water to each island through the vessel equipped with the desalination apparatus, operation efficiency has to be considered. As the operation of the vessel requires operating costs such as fuel costs and manpower, it is necessary to complete the provision of fresh water at the minimum cost.

In addition, on the west and south coasts of South Korea, small islands are concentrated, and in order to provide fresh water to the islands, it is necessary to optimize the path of the vessel that provides fresh water in consideration of the fresh water retention status of each island On the other hand, recently, research related to the development of autonomous navigation vessels and business models utilizing autonomous navigation vessels have been proposed in various ways.

DISCLOSURE

Technical Problem

The present disclosure has been contrived to solve the above problems, and provides a system for fresh water supply using a desalination vessel and an autonomous navigation vessel capable of, in providing fresh water to a plurality of islands using a vessel equipped with a desalination apparatus and an autonomous navigation vessel, setting an optimal fresh water supply route in consideration of the fresh water retention status of islands, location information of islands, and fresh water requirement amount for each route, and based on this, supplying fresh water to each of the islands, thereby minimizing the operation cost of the vessels and stably providing fresh water to the islands requiring fresh water.

Technical Solution

A system for fresh water supply using a desalination vessel and an autonomous navigation vessel according to the present disclosure for achieving the above object includes: a desalination vessel capable of storing fresh water and towing an autonomous navigation fresh water supply vessel; and the autonomous navigation fresh water supply vessel that supplies fresh water to each of islands that require fresh water, in which the autonomous navigation fresh water supply vessel includes an autonomous navigation system and a fresh water supply control system, the autonomous navigation system guides the autonomous navigation fresh water supply vessel to be subjected to autonomous navigation along a fresh water supply route set by a route setting module of the fresh water supply control system, and the fresh water supply control system is configured to include a DB block that stores location information for a plurality of islands which are fresh water provision targets, fresh water storage capacity information of a fresh water storage tank provided in each of the islands, real-time fresh water consumption information of each of the islands, fresh water retention amount information retained by the desalination vessel, basic route information, fresh water supply route information, and fresh water requirement information of the fresh water supply route, a fresh water consumption-retention amount management module that respectively stores the real-time fresh water consumption information of each of the islands input from each of the islands and the fresh water retention amount information of the vessel input from the desalination vessel in an island-specific real-time fresh water consumption DB and a vessel fresh water retention amount DB of the DB block, under the control of a fresh water supply navigation server, the route setting module that sets the fresh water supply route, calculates a fresh water requirement of the fresh water supply route, and transmits a fresh water supply path and the calculated fresh water requirement information of the fresh water supply route to a vessel server of the desalination vessel through the fresh water supply navigation server, under the control of the fresh water supply navigation server, and the fresh water supply navigation server that has a role of controlling the storing of the real-time fresh water consumption information input from a communication module of each of the islands and the vessel fresh water retention amount information input from the desalination vessel in the DB block by the fresh water consumption-retention amount management module, and a role of controlling the setting of the fresh water supply path by the route setting module and the calculating of the fresh water requirement of the fresh water supply path and transmitting the fresh water requirement information of the fresh water supply path calculated by the route setting module to the vessel server of the desalination vessel.

The DB block is configured to include: an island location information DB that stores the location information for the plurality of islands which are fresh water provision targets; an island-specific fresh water storage capacity DB that stores the fresh water storage capacity information of the fresh water storage tank provided in each of the islands; an island-specific real-time fresh water consumption DB that stores the real-time fresh water consumption information of each of the islands; a vessel fresh water retention amount DB that stores the fresh water retention amount information retained by the desalination vessel; and a route information DB that stores the basic route information, the fresh water supply route information, and the fresh water requirement information of the fresh water supply route, a basic route is a route through which all islands which are fresh water provision targets are passed, and the fresh water supply route is a route excluding islands that do not require supply of fresh water from the islands included in the basic route, and is set by the route setting module based on the basic route information and the real-time fresh water consumption information of each of the islands.

The route setting module checks islands in which fresh water in an amount of a reference value or more has been consumed through the island-specific real-time fresh water consumption DB, sets the fresh water supply route by extracting the islands in which fresh water in an amount of the reference value or more has been consumed from the basic route stored in the route information DB, and calculates the fresh water requirement of the fresh water supply route by summing fresh water requirements required for islands belonging to the fresh water supply route based on the fresh water supply route.

The route setting module compares the vessel fresh water retention amount information to the fresh water requirement information of the fresh water supply route and transmits the difference to the vessel server of the desalination vessel or transmits the fresh water requirement information of the fresh water supply route to the vessel server of the desalination vessel.

An urgent fresh water supply processing module is further included that transmits an urgent fresh water supply message to the vessel server of the desalination vessel in response to urgent fresh water supply requested from a client of each of the islands, in which the client of each of the islands transmits the location information of the island and urgent fresh water requirement information to the fresh water supply navigation server through the communication module of each of the islands, and the location information of the island and the urgent fresh water requirement information are transmitted to the vessel server of the desalination vessel in a form of the urgent fresh water supply message by the urgent fresh water supply processing module.

A water level sensor provided at one side of the fresh water storage tank of each of the islands detects a water level of the fresh water storage tank, water level information of the fresh water storage tank detected by the water level sensor is transmitted to the fresh water supply navigation server through the communication module of each of the islands, and the fresh water consumption-retention amount management module stores fresh water consumption information of each of the islands, which is the water level information of the fresh water storage tank, in the island-specific real-time fresh water consumption DB of the DB block, under the control of the fresh water supply navigation server.

The fresh water supply navigation server identifies islands in which fresh water in an amount of a reference value or more has been consumed through the island-specific real-time fresh water consumption DB, and in a case where the number of islands in which fresh water in an amount of the reference value or more has been consumed is a preset value or more, performs a fresh water supply route setting process.

In a case where the urgent fresh water supply to a specific island is performed, fresh water supply amount information for the island is reflected in the island-specific real-time fresh water consumption DB of the DB block, and the route setting module sets a water supply route based on the island-specific real-time fresh water consumption DB in which the presence or absence of the urgent fresh water supply is reflected and calculates vessel fresh water requirement information.

The vessel server stores fresh water storage capacity information of each of autonomous navigation fresh water supply vessels, designates autonomous navigation fresh water supply vessels to be subjected to autonomous navigation along the fresh water supply path, and transmits an autonomous navigation message to each of the autonomous navigation fresh water supply vessels.

In addition, the vessel server may designate one or a plurality of autonomous navigation fresh water supply vessels to be subjected to autonomous navigation based on the fresh water requirement information of the set fresh water supply path, in consideration of topography of each of the islands.

The autonomous navigation system and the fresh water supply control system may be mounted in the desalination vessel.

Advantageous Effects

The system for fresh water supply using a desalination vessel and an autonomous navigation vessel according to the present disclosure has the following effects.

An optimal route, that is, an optimal fresh water supply path is set based on the real-time fresh water consumption information for the islands that require fresh water, and the fresh water requirement consumed by the fresh water supply path is calculated, thereby efficiently managing the production of fresh water by the desalination vessel and stably supplying fresh water to a plurality of islands through the optimal route.

In addition, operation costs can be minimized by supplying fresh water using the autonomous navigation vessel.

BEST MODE

Figure 1:
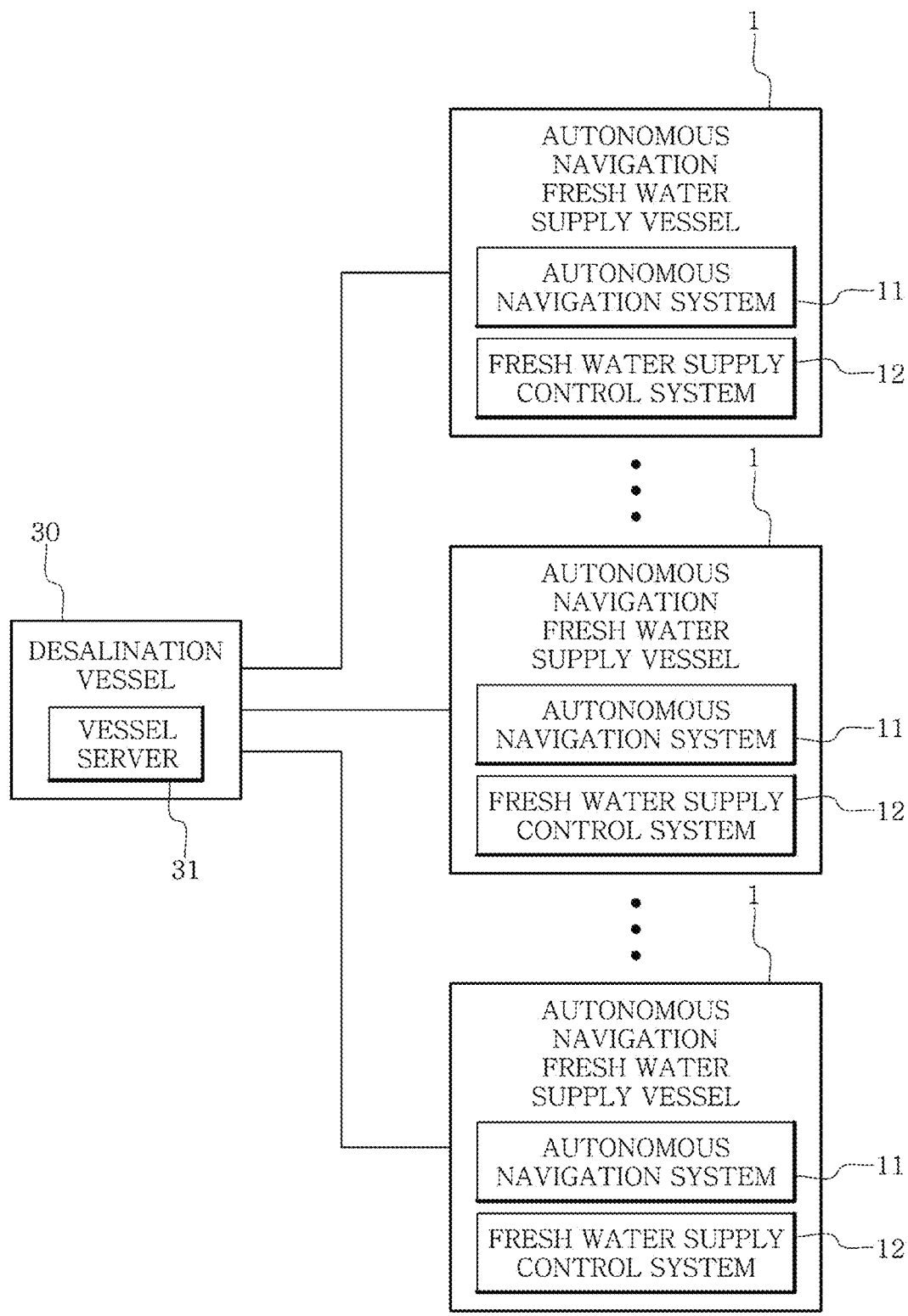
FIG. 1 is a block diagram of a system for fresh water supply using a desalination vessel and an autonomous navigation vessel according to an embodiment of the present disclosure.

The present disclosure proposes a technology capable of efficiently providing fresh water to a plurality of islands using a desalination vessel and an autonomous navigation fresh water supply vessel.

In the present specification, the "desalination vessel" means a vessel provided with a desalination apparatus to produce fresh water or store the fresh water produced by the desalination apparatus. In addition, the desalination vessel according to the present disclosure has a function of towing the autonomous navigation fresh water supply vessel. In the present specification, the "autonomous navigation fresh water supply vessel" means an autonomous navigation-based vessel that has a role of supplying fresh water to a plurality of islands, and the fresh water supplied by the autonomous navigation fresh water supply vessel to each island is supplied from the desalination vessel.

In the present disclosure, providing fresh water to a plurality of islands through the autonomous navigation fresh water supply vessel means that the autonomous navigation fresh water supply vessel provides fresh water supplied from the desalination vessel to each island via each island.

In order to efficiently perform the act of providing fresh water to a plurality of islands through the autonomous navigation fresh water supply vessel, it is necessary to identify islands that require fresh water and to pass through the islands that require fresh water in an optimal route.

More specifically, basic route information for passing through all of the plurality of islands which are fresh water provision targets has to be required, and real-time fresh water retention amount information of each island has to be reflected in order to set an optimal route, that is, an optimal fresh water supply route. In other words, the optimal fresh water supply route has to be set by reflecting the fresh water retention amount information of each island in the basic route information. In addition, if the optimal fresh water supply route is set, the fresh water requirement required for the fresh water supply route may be calculated, the fresh water requirement information of the fresh water supply route has to be provided to allow the desalination vessel to produce and retain fresh water so that the autonomous navigation fresh water supply vessel can satisfy the fresh water requirement of the fresh water supply route.

In summary, it can be said that the technical idea of the present disclosure is that a fresh water supply route for a plurality of islands that require fresh water is set by reflecting real-time fresh water retention amount information of each island, the fresh water requirement information of the fresh water supply route is shared with the desalination vessel so as to allow the desalination vessel to produce a fresh water requirement consumed by the fresh water supply route, and based on this, the autonomous navigation fresh water supply vessel stably provides fresh water to the plurality of islands that require fresh water through an optimal fresh water supply route.

Hereinafter, a system for fresh water supply using a desalination vessel and an autonomous navigation vessel according to an embodiment of the present disclosure will be described in detail with reference to the drawings.

Figure 2:
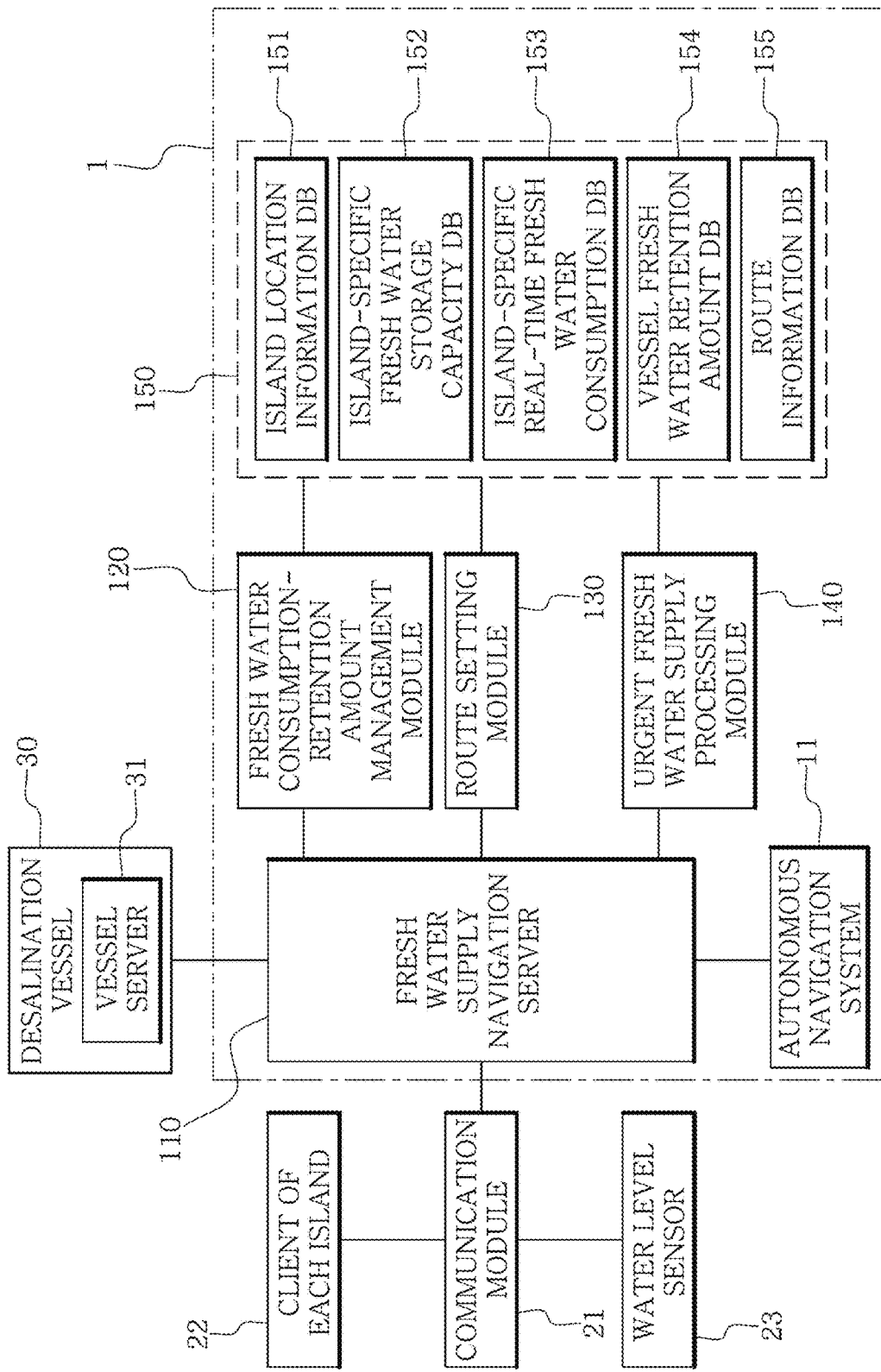
FIG. 2 is a block diagram of an autonomous navigation system and a fresh water supply control system.

Referring to FIGS. 1 and 2, the system for fresh water supply using a desalination vessel and an autonomous navigation vessel according to the embodiment of the present disclosure includes a desalination vessel 30 and an autonomous navigation fresh water supply vessel 1.

The desalination vessel 30 may produce and store fresh water using a desalination apparatus or store only fresh water produced by the desalination apparatus, and the fresh water stored in the desalination vessel 30 may be supplied to the autonomous navigation fresh water supply vessel 1. The desalination vessel 30 has a function of towing the autonomous navigation fresh water supply vessel 1.

The autonomous navigation fresh water supply vessel 1 has a role of being supplied with fresh water from the desalination vessel 30 and providing the fresh water to the islands that require fresh water, and is operated based on autonomous navigation when a state of being towed by the desalination vessel 30 is released. The desalination vessel 30 and the autonomous navigation fresh water supply vessel 1 each have a computer system and are connected by wireless communication. Here, the desalination vessel 30 may be an autonomous navigation-based unmanned vessel or may be operated by a person, similar to the autonomous navigation fresh water supply vessel 1. In addition, there may be one or a plurality of autonomous navigation fresh water supply vessels 1 that are towed by the desalination vessel 30 to supply fresh water to each island.

Supplying fresh water to each island on the basis of the desalination vessel 30 and the autonomous navigation fresh water supply vessel 1 can be achieved by the autonomous navigation system 11 and the fresh water supply control system 12. The fresh water supply control system 12 sets a fresh water supply route for a plurality of islands that require fresh water by reflecting the real-time fresh water retention amount information of each island, and shares the fresh water requirement information of the fresh water supply route with the desalination vessel 1 to allow the desalination vessel to produce the fresh water requirement consumed by the fresh water supply route, and the autonomous navigation system 11 is a device that guides the autonomous navigation fresh water supply vessel 1 to be subjected to autonomous navigation along an optimal fresh water supply route set by the fresh water supply control system 12.

The autonomous navigation system 11 and the fresh water supply control system 12 are mounted in the autonomous navigation fresh water supply vessel 1, and may also be mounted in the desalination vessel 30 as necessary. In the description of the present specification, the autonomous navigation system 11 and the fresh water supply control system 12 are mounted in the autonomous navigation fresh water supply vessel 1.

The autonomous navigation system 11 mounted in the autonomous navigation fresh water supply vessel 1 is configured in a combination of Electronic Navigational Chart (ENC), Inertial Navigation System (INS), Lidar, and a collision avoidance path search system to enable autonomous navigation of the vessel. In addition, the autonomous navigation system 11 operates on the basis of the optimal fresh water supply route set by a route setting module 130 of the fresh water supply control system 12, which will be described later, and enables the autonomous navigation fresh water supply vessel 1 to supply fresh water to each island. Here, known commercially available technologies can be applied to Electronic Navigational Chart (ENC), Inertial Navigation System (INS), Lidar, and the collision avoidance path search system described above.

Before describing the detailed configuration of the fresh water supply control system 12, the computer system of the desalination vessel 30 will be described as follows.

The desalination vessel 30 is provided with a vessel server 31. As described above, the autonomous navigation system 11 and the fresh water supply control system 12 may be provided in the desalination vessel 30 as necessary.

The vessel server 31 of the desalination vessel 30 has a role of controlling the production of fresh water by the desalination apparatus based on the fresh water requirement information of a fresh water supply path calculated by the route setting module 130 of the fresh water supply control system 12.

In addition, the vessel server 31 has a role of storing fresh water storage capacity information of each autonomous navigation fresh water supply vessel 1, and designating the autonomous navigation fresh water supply vessel 1 to be subjected to autonomous navigation along the fresh water supply path, and transmitting an autonomous navigation messages to each autonomous navigation fresh water supply vessel 1. In a case where a plurality of autonomous navigation fresh water supply vessels 1 are provided, the fresh water storage capacity information of each autonomous navigation fresh water supply vessel 1 is stored in the vessel server 31, and the vessel server 31 may designate one or a plurality of autonomous navigation fresh water supply vessels 1 to be subjected to autonomous navigation based on the fresh water requirement information of the fresh water supply path set by the fresh water supply control system 12.

In addition, the vessel server 31 designates one or a plurality of autonomous navigation fresh water supply vessels 1 to be subjected to autonomous navigation based on the fresh water requirement information of the set fresh water supply path, in consideration of the topography of each island. For example, if the water depth around the island is shallow, a small-scale autonomous navigation fresh water supply vessel is preferentially designated, whereas if the water depth is deep, a large-scale autonomous navigation fresh water supply vessel is preferentially designated or fresh water is directly supplied by the desalination vessel.

The fresh water supply control system 12 mounted in the autonomous navigation fresh water supply vessel 1 is configured as follows. Here, as described above, the fresh water supply control system 12 may be mounted in the desalination vessel 30 as well as in the autonomous navigation fresh water supply vessel 1.

The fresh water supply control system 12 includes a fresh water supply navigation server 110, a fresh water consumption-retention amount management module 120, the route setting module 130, an urgent fresh water supply processing module 140, and a DB block 150.

The fresh water supply navigation server 110 has a role of storing the real-time fresh water consumption information of each island and vessel fresh water retention amount information, setting the fresh water supply path, and calculating the fresh water requirement of the fresh water supply path, and the detailed description thereof will be described later.

The fresh water consumption-retention amount management module 120 has a role of selectively storing the real-time fresh water consumption information of each island input from each island and the vessel fresh water retention amount information input from the desalination vessel 30 in an island-specific real-time fresh water consumption DB 153 and a vessel fresh water retention amount DB 154 of the DB block 150, under the control of the fresh water supply navigation server 110.

Prior to the description of the route setting module 130, the DB block 150 will be described first as follows. The DB block 150 sets an optimal fresh water supply route for passing through a plurality of islands that require fresh water, and stores all information for calculating the fresh water requirement information of the vessel required for the fresh water supply route.

Specifically, the DB block 150 includes has a role of storing the location information for a plurality of islands which are fresh water provision targets, the fresh water storage capacity information of a fresh water storage tank provided in each island, the real-time fresh water consumption information of each island, the fresh water retention amount information of the desalination vessel 30, route information for passing through each island, and the fresh water requirement information for each route.

The DB block 150 includes, in detail, an island location information DB 151, an island-specific fresh water storage capacity DB 152, the island-specific real-time fresh water consumption DB 153, the vessel fresh water retention amount DB 154, and a route information DB 155.

The island location information DB 151 stores the location information for the plurality of islands which are fresh water provision targets, and may store GPS information of each island. The island-specific fresh water storage capacity DB 152 stores the fresh water storage capacity information of the fresh water storage tank provided in each island, and the island-specific real-time fresh water consumption DB 153 stores the real-time fresh water consumption information of each island. A water level sensor 23 is provided at one side of the fresh water storage tank of each island, and the fresh water consumption information of the fresh water storage tank detected by the water level sensor 23 may be transmitted to the fresh water supply navigation server 110 through a communication module 21 provided in each island and stored in the island-specific real-time fresh water consumption DB 153. The vessel fresh water retention amount DB 154 stores the fresh water retention amount information retained by the desalination vessel 30, so that the fresh water retention amount information currently retained by the desalination vessel 30 may be stored in the vessel fresh water retention amount DB 154 through communication between the vessel server 31 provided in the desalination vessel 30 and the fresh water supply navigation server 110.

The route information DB 155 stores basic route information, fresh water supply route information, and fresh water requirement information of the fresh water supply route. The basic route means a route through which all islands which are fresh water provision targets are passed. In this case, the route may be set so that all islands which are fresh water provision targets can be passed through one basic route, or all islands which are fresh water provision targets can be passed through a plurality of basic routes. In the case of setting a plurality of basic routes, for example, if the fresh water provision targets are ten islands, a first basic route may be set to pass through first to third islands, and a second basic route may be set to pass through fourth to sixth islands, a third basic route may be set to pass through seventh to tenth islands. In the case of setting one basic route, all the first to tenth islands are passed through one basic route. The basic route can be arbitrarily set and changed by a client. Here, the client is connected to the fresh water supply navigation server 110 and can generate, as well as events for setting and changing the basic route as described above, events necessary for managing the supply of fresh water, such as storing the location information of islands and storing the fresh water storage capacity for each island.

The fresh water supply route information stored in the route information DB 155 is set by the route setting module 130, which will be described later, based on the basic route information and the real-time fresh water consumption information of each island, and means a route excluding islands that do not require the supply of fresh water from the islands included in the basic route. In addition, the fresh water requirement information of the fresh water supply route means the fresh water requirement information of the islands included in the fresh water supply route, and may be calculated based on the real-time fresh water consumption information of the islands included in the fresh water supply route.

The DB block 150 has been described above. Subsequent to the description of the fresh water consumption-retention amount management module 120, the route setting module 130 has the following role.

The route setting module 130 has a role of setting the fresh water supply route, calculating the fresh water requirement of the fresh water supply route, and transmitting the fresh water supply path and the calculated fresh water requirement information of the fresh water supply route to the vessel server 31 of the desalination vessel 30 through the fresh water supply navigation server 110, under the control of the fresh water supply navigation server 110. The autonomous navigation system 11 of the autonomous navigation fresh water supply vessel 1 performs autonomous navigation for each island based on the fresh water supply route generated by the route setting module 130.

The fresh water supply route is set as follows. The route setting module 130 checks the islands in which fresh water in an amount of a reference value or more has been consumed through the island-specific real-time fresh water consumption DB 153. For example, in a case where 70% or more of fresh water is consumed compared to the fresh water storage capacity, this can be regarded as an island in which fresh water in an amount of the reference value or more has been consumed. Subsequently, the route setting module 130 sets a fresh water supply route by extracting the islands in which fresh water in an amount of the reference value or more has been consumed from the basic route stored in the route information DB 155. In other words, the fresh water supply route can be regarded as a route excluding islands that do not require the supply of fresh water, from the basic route.

In a state in which the fresh water supply route is set, the route setting module 130 sums and calculates the fresh water requirements required for the islands belonging to the fresh water supply route based on the fresh water supply route. The fresh water requirement of each island may be calculated by subtracting the real-time fresh water consumption information of the island from the fresh water storage capacity information of the island.

The fresh water requirement information of the fresh water supply route calculated by the route setting module 130 is transmitted to the vessel server 31 of the desalination vessel 30 through the fresh water supply navigation server 110 as described above. As a more specific embodiment, the vessel fresh water retention amount information and the fresh water requirement information of the fresh water supply route are compared to each other, and the difference therebetween may be transmitted to the vessel server 31. For example, in a case where the vessel fresh water retention amount is 80 L and the fresh water requirement of the fresh water supply route is 100 L, the route setting module 130 may transmit information indicating that 20 L of fresh water has to be additionally produced, to the vessel server 31. In addition to these embodiments, the fresh water requirement information of the fresh water supply route may be transmitted to the vessel server 31 of the desalination vessel 30, and the vessel server 31 may compare the vessel fresh water retention amount information to the fresh water requirement information of the fresh water supply route and self-determine whether or not to additionally produce fresh water and the amount of fresh water to be produced.

The urgent fresh water supply processing module 140 has a role of transmitting an urgent fresh water supply message to the vessel server 31 in response to urgent fresh water supply requested from the client of each island 22. The client of each island 22 may transmit the island location information and the urgent fresh water requirement information to the fresh water supply navigation server 110 through the communication module 21 of each island, and the island location information and the urgent fresh water requirement information may be transmitted from the urgent fresh water supply processing module 140 to the vessel server 31 of the desalination vessel 30 in the form of an urgent fresh water supply message so that fresh water can be urgently supplied to the island by the autonomous navigation fresh water supply vessel 1. At this time, in a case where urgent fresh water supply to a specific island is performed, the fresh water supply amount information for the island is reflected in the island-specific real-time fresh water consumption DB 153 of the DB block 150, and the route setting module 130 sets a water supply route based on the island-specific real-time fresh water consumption DB 153 in which the presence or absence of the urgent fresh water supply is reflected and calculates the vessel fresh water requirement information.

The fresh water supply navigation server 110 has a role of controlling the storing of the real-time fresh water consumption information input from the communication module 21 of each island and the vessel fresh water retention amount information input from the desalination vessel 30 in the DB block 150 by the fresh water consumption-retention amount management module 120, a role of controlling the setting of the fresh water supply path by the route setting module 130 and the calculating of the fresh water requirement of the fresh water supply path and transmitting the fresh water requirement (or the difference between the vessel fresh water retention amount and the fresh water requirement of the fresh water supply route) information of the fresh water supply path calculated by the route setting module 130 to the vessel server 31 of the desalination vessel 30, and a role of transmitting the urgent fresh water supply message requested from the client of each island 22 to the vessel server 31. In addition, the fresh water supply navigation server 110 has a role of managing all information stored in the DB block 150.

Figure 3:
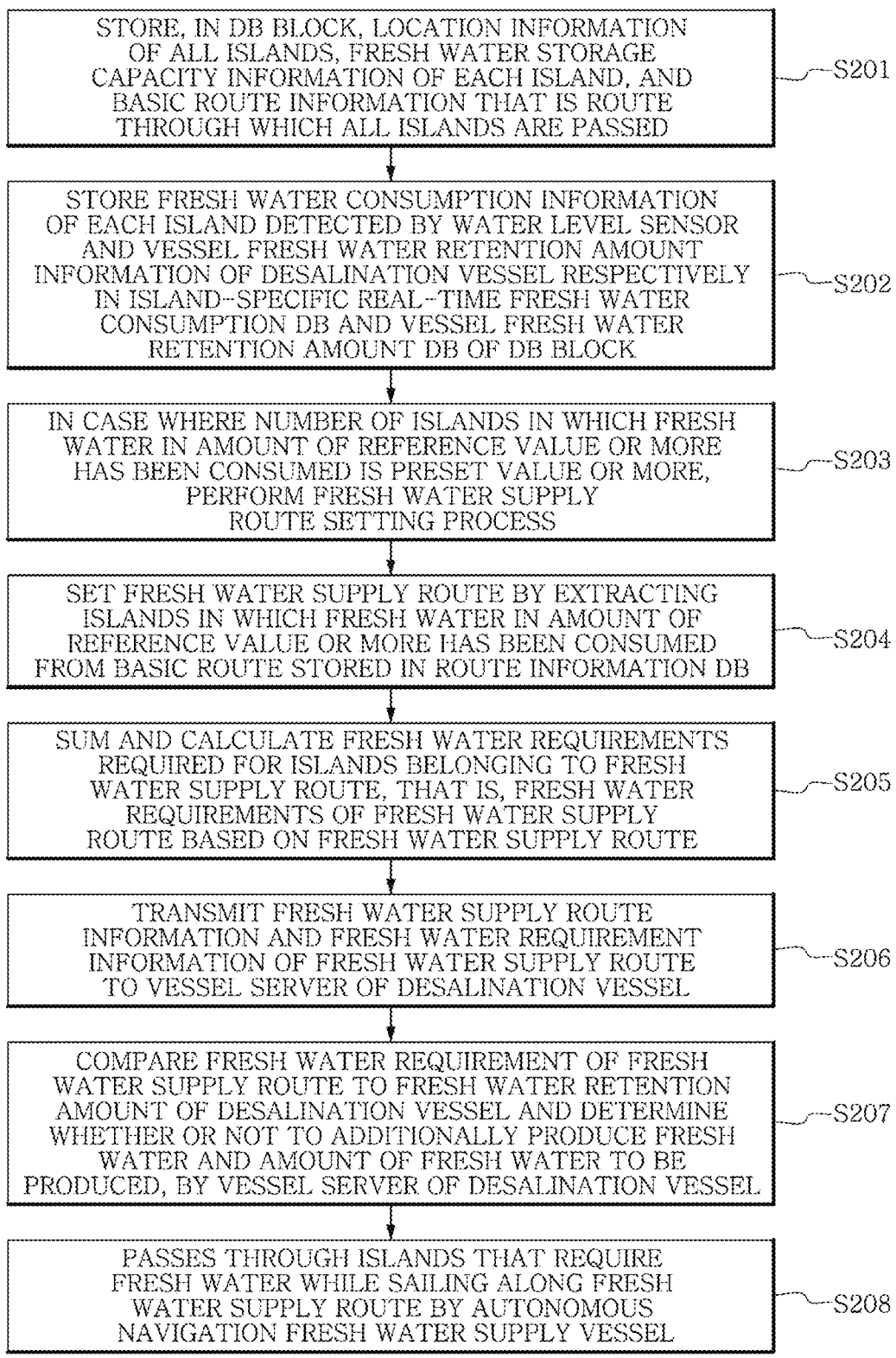
FIG. 3 is a flowchart for describing an operation of the system for fresh water supply using a desalination vessel and an autonomous navigation vessel according to the embodiment of the present disclosure.

The system for fresh water supply using a desalination vessel and an autonomous navigation vessel according to the embodiment of the present disclosure has been described above. Hereinafter, an operation of the system for fresh water supply using a desalination vessel and an autonomous navigation vessel according to the embodiment of the present disclosure will be described with reference to FIG. 3.

First, the DB block 150 stores the location information of all islands which are fresh water provision targets through the client, the fresh water storage capacity information of each island, and the basic route information that is a route through which all the islands are passed (S201).

In this state, the water level sensor 23 provided at one side of the fresh water storage tank of each island detects the water level of the fresh water storage tank, and the water level information of the fresh water storage tank detected by the water level sensor 23 is transmitted to the fresh water supply navigation server 110 through the communication module 21 of each island. Under the control of the fresh water supply navigation server 110, the fresh water consumption-retention amount management module 120 stores the input water level information of the fresh water storage tank, that is, the fresh water consumption information of each island, in the island-specific real-time fresh water consumption DB 153 of the DB block 150 (S202).

In addition, the fresh water retention amount information retained by the desalination vessel 30 is transmitted to the fresh water supply navigation server 110 by the vessel server 31 of the desalination vessel 30, and under the control of the fresh water supply navigation server 110, the fresh water consumption-retention amount management module 120 stores the input vessel fresh water retention amount information in the vessel fresh water retention amount DB 154 of the DB block 150 (S202).

Subsequently, the fresh water supply navigation server 110 identifies islands in which fresh water in an amount of the reference value or more has been consumed through the island-specific real-time fresh water consumption DB 153, and in a case where the number of islands in which fresh water in an amount of the reference value or more has been consumed is a preset value or more, performs a fresh water supply route setting (S203). In an embodiment, when 5 or more out of 10 islands which are fresh water provision targets are islands in which fresh water in an amount of the reference value or more has been consumed, the fresh water supply route setting process may be performed.

Specifically, the route setting module 130 checks islands in which fresh water in an amount of the reference value or more has been consumed through the island-specific real-time fresh water consumption DB 153, and sets a fresh water supply route by extracting the islands in which fresh water in an amount of the reference value or more has been consumed from the basic route stored in the route information DB 155 (S204). Then, based on the set fresh water supply route, the fresh water requirements required for the islands belonging to the fresh water supply route, that is, the fresh water requirements of the fresh water supply route, are summed and calculated (S205). The fresh water requirement of each island may be calculated by subtracting the real-time fresh water consumption information of each island from the fresh water storage capacity information of each island.

In a state in which the fresh water supply route is set and the fresh water requirement of the fresh water supply route is calculated, the fresh water supply route information and the fresh water requirement of the fresh water supply route are transmitted to the vessel server 31 of the desalination vessel 30 through the fresh water supply navigation server 110 (S206).

Figure 4A:
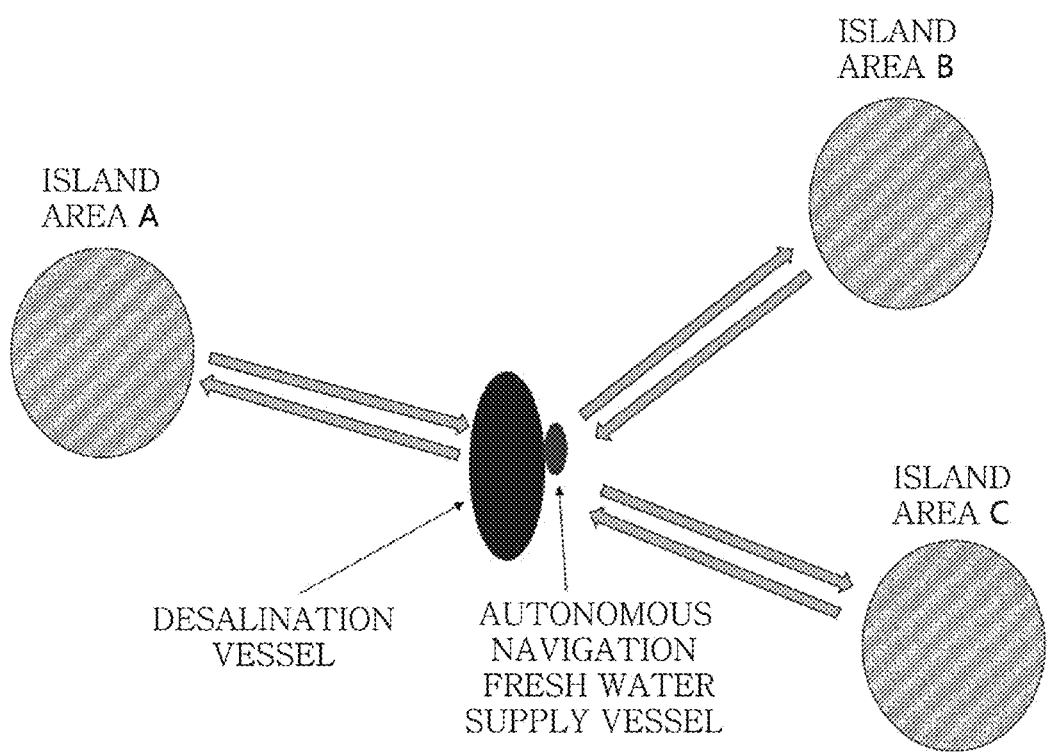
FIGS. 4A and 4B are reference diagrams for describing the concept of the supply of fresh water by the system for fresh water supply using a desalination vessel and an autonomous navigation vessel according to the embodiment of the present disclosure.
Figure 4B:
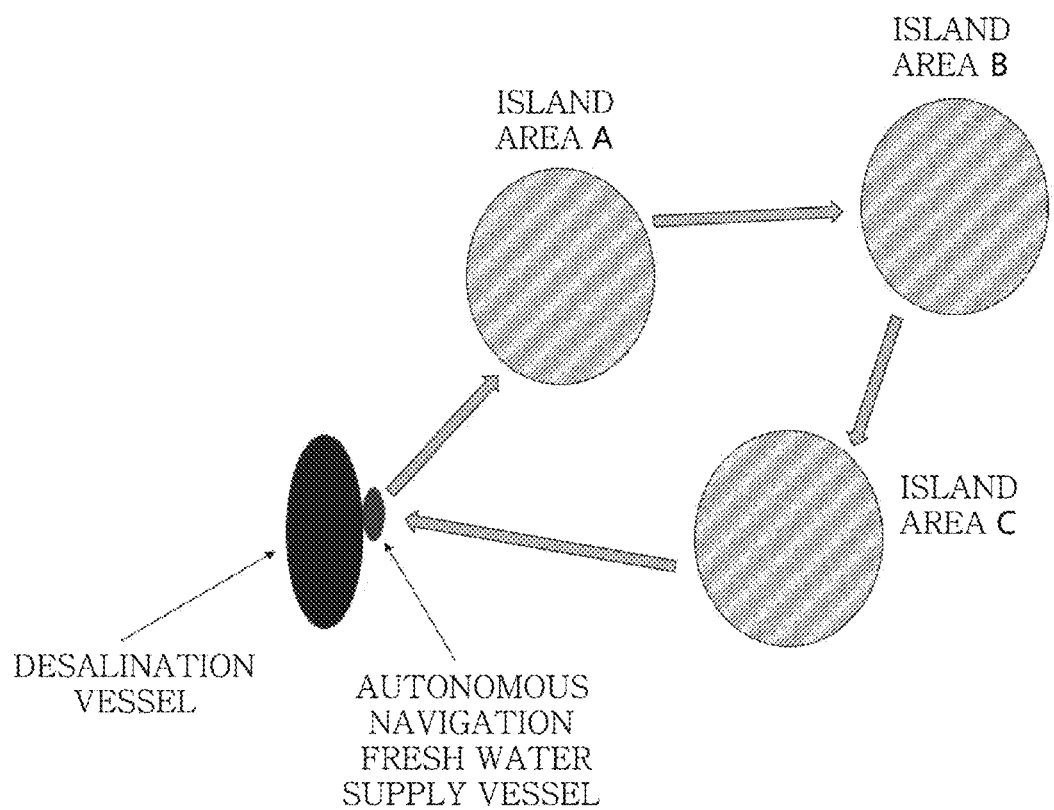

The vessel server 31 of the desalination vessel 30 satisfies the fresh water requirement of the fresh water supply route by comparing the fresh water requirement of the fresh water supply route to the fresh water retention amount of the desalination vessel 30 and determining whether or not to additionally produce fresh water and the amount of fresh water to be produced (S207). Subsequently, when the autonomous navigation fresh water supply vessel 1 finally passes through the islands that require fresh water while sailing along the fresh water supply route (see FIGS. 4A and 4B), a fresh water supply method using the desalination vessel and the autonomous navigation vessel according to the embodiment of the present disclosure is completed (S208).

At this time, in a case where a plurality of autonomous navigation fresh water supply vessels 1 are provided, fresh water storage capacity information of each autonomous navigation fresh water supply vessel 1 is stored in the vessel server 31, and the vessel server 31 may designate one or a plurality of autonomous navigation fresh water supply vessels 1 to be subjected to autonomous navigation based on the fresh water requirement information of the fresh water supply path set by the fresh water supply control system 12. In addition, the vessel server 31 may designate one or a plurality of autonomous navigation fresh water supply vessels to be subjected to autonomous navigation based on the fresh water requirement information of the set fresh water supply path, in consideration of the topography of each island. For example, if the water depth around the island is shallow, a small-scale autonomous navigation fresh water supply vessel is preferentially designated, whereas if the water depth is deep, a large-scale autonomous navigation fresh water supply vessel is preferentially designated or fresh water is directly supplied by the desalination vessel.

On the other hand, the fresh water supply method using the desalination vessel and the autonomous navigation vessel according to the embodiment of the present disclosure as described above is a method of setting an optimal route, that is, a fresh water supply route based on the real-time fresh water consumption information for each island input from each island, calculating the fresh water requirement information, allowing the desalination vessel to produce fresh water based on this, and supplying fresh water to each island through the fresh water supply route by the autonomous navigation fresh water supply vessel, and there may be cases of urgent need due to an emergency situation in a specific island. In response to this case, although not described in the flowchart of FIG. 3, the client of each island 22 may generate an urgent fresh water supply message event including the location information of the island and urgent fresh water requirement information, and the urgent fresh water supply message may be transmitted to the vessel server 31 so that fresh water can be urgently supplied to the island through the autonomous navigation fresh water supply vessel 1.

At this time, in a case where urgent fresh water supply to a specific island is performed, the fresh water supply amount information for the island is reflected in the island-specific real-time fresh water consumption DB 153 of the DB block 150, and the route setting module 130 sets a water supply route based on the island-specific real-time fresh water consumption DB 153 in which the presence or absence of the urgent fresh water supply is reflected and calculates the vessel fresh water requirement information.

For reference, the desalination vessel 30 and the autonomous navigation fresh water supply vessel 1 may be operated based on electricity or diesel fuel.

DETAILED DESCRIPTION OF MAIN ELEMENTS

1: Autonomous navigation fresh water supply vessel
11: Autonomous navigation system
12: Fresh water supply control system
21: Communication module
22: Client of each island
23: Water level sensor
30: Desalination vessel 31: Vessel server
110: Fresh water supply navigation server
120: Fresh water consumption-retention amount management module
130: Route setting module
140: Urgent fresh water supply processing module
150: DB block
151: Island location information DB
152: Island-specific fresh water storage capacity DB
153: Island-specific real-time fresh water consumption DB
154: Vessel fresh water retention amount DB
155: Route information DB

The invention claimed is:

1. A system for fresh water supply using a desalination vessel and an autonomous navigation vessel, comprising:
a desalination vessel capable of storing fresh water and towing an autonomous navigation fresh water supply vessel; and
the autonomous navigation fresh water supply vessel that supplies fresh water to each of islands that require fresh water,
wherein the autonomous navigation fresh water supply vessel includes an autonomous navigation system and a fresh water supply control system,
the autonomous navigation system guides the autonomous navigation fresh water supply vessel to be subjected to autonomous navigation along a fresh water supply route set by a second processor of the fresh water supply control system, and
the fresh water supply control system is configured to include
a memory device that stores location information for a plurality of islands which are fresh water provision targets, fresh water storage capacity information of a fresh water storage tank provided in each of the islands, real-time fresh water consumption information of each of the islands, fresh water retention amount information retained by the desalination vessel, basic route information, fresh water supply route information, and fresh water requirement information of the fresh water supply route,
a first processor that respectively stores the real-time fresh water consumption information of each of the islands input from each of the islands and the fresh water retention amount information of the vessel input from the desalination vessel in an island-specific real-time fresh water consumption DB and a vessel fresh water retention amount DB of the memory device, under the control of a fresh water supply navigation server,
the second processor that sets the fresh water supply route, calculates a fresh water requirement of the fresh water supply route, and transmits a fresh water supply path and the calculated fresh water requirement information of the fresh water supply route to a vessel server of the desalination vessel through the fresh water supply navigation server, under the control of the fresh water supply navigation server, and
the fresh water supply navigation server that has a role of controlling the storing of the real-time fresh water consumption information input from a communication device of each of the islands and the vessel fresh water retention amount information input from the desalination vessel in the memory device by the first processor, and a role of controlling the setting of the fresh water supply path by the second processor and the calculating of the fresh water requirement of the fresh water supply path and transmitting the fresh water requirement information of the fresh water supply path calculated by the second processor to the vessel server of the desalination vessel.

2. The system for fresh water supply using a desalination vessel and an autonomous navigation vessel according to claim 1,
wherein the memory device is configured to include:
an island location information DB that stores the location information for the plurality of islands which are fresh water provision targets;
an island-specific fresh water storage capacity DB that stores the fresh water storage capacity information of the fresh water storage tank provided in each of the islands;
an island-specific real-time fresh water consumption DB that stores the real-time fresh water consumption information of each of the islands;
a vessel fresh water retention amount DB that stores the fresh water retention amount information retained by the desalination vessel; and
a route information DB that stores the basic route information, the fresh water supply route information, and the fresh water requirement information of the fresh water supply route,
a basic route is a route through which all islands which are fresh water provision targets are passed, and
the fresh water supply route is a route excluding islands that do not require supply of fresh water from the islands included in the basic route, and is set by the second processor based on the basic route information and the real-time fresh water consumption information of each of the islands.

3. The system for fresh water supply using a desalination vessel and an autonomous navigation vessel according to claim 2, wherein the second processor checks islands in which fresh water in an amount of a reference value or more has been consumed through the island-specific real-time fresh water consumption DB, sets the fresh water supply route by extracting the islands in which fresh water in an amount of the reference value or more has been consumed from the basic route stored in the route information DB, and calculates the fresh water requirement of the fresh water supply route by summing fresh water requirements required for islands belonging to the fresh water supply route based on the fresh water supply route.

4. The system for fresh water supply using a desalination vessel and an autonomous navigation vessel according to claim 2,
wherein a water level sensor provided at one side of the fresh water storage tank of each of the islands detects a water level of the fresh water storage tank,
water level information of the fresh water storage tank detected by the water level sensor is transmitted to the fresh water supply navigation server through the communication device of each of the islands, and
the first processor stores fresh water consumption information of each of the islands, which is the water level information of the fresh water storage tank, in the island-specific real-time fresh water consumption DB of the memory device, under the control of the fresh water supply navigation server.

5. The system for fresh water supply using a desalination vessel and an autonomous navigation vessel according to claim 2, wherein the fresh water supply navigation server identifies islands in which fresh water in an amount of a reference value or more has been consumed through the island-specific real-time fresh water consumption DB, and in a case where the number of islands in which fresh water in an amount of the reference value or more has been consumed is a preset value or more, performs a fresh water supply route setting process.

6. The system for fresh water supply using a desalination vessel and an autonomous navigation vessel according to claim 1, wherein the second processor compares the vessel fresh water retention amount information to the fresh water requirement information of the fresh water supply route and transmits the difference to the vessel server of the desalination vessel or transmits the fresh water requirement information of the fresh water supply route to the vessel server of the desalination vessel.

7. The system for fresh water supply using a desalination vessel and an autonomous navigation vessel according to claim 1, further comprising:
- a message transmitting device that transmits an urgent fresh water supply message to the vessel server of the desalination vessel in response to urgent fresh water supply requested from a client of each of the islands,
- wherein the client of each of the islands transmits the location information of the island and urgent fresh water requirement information to the fresh water supply navigation server through the communication device of each of the islands, and
- the location information of the island and the urgent fresh water requirement information are transmitted to the vessel server of the desalination vessel in a form of the urgent fresh water supply message by the message transmitting device.

8. The system for fresh water supply using a desalination vessel and an autonomous navigation vessel according to claim 7,
wherein, in a case where the urgent fresh water supply to a specific island is performed, fresh water supply amount information for the island is reflected in the island-specific real-time fresh water consumption DB of the memory device, and
the second processor sets a water supply route based on the island-specific real-time fresh water consumption DB in which the presence or absence of the urgent fresh water supply is reflected and calculates vessel fresh water requirement information.

9. The system for fresh water supply using a desalination vessel and an autonomous navigation vessel according to claim 1, wherein the vessel server stores fresh water storage capacity information of each of autonomous navigation fresh water supply vessels, designates autonomous navigation fresh water supply vessels to be subjected to autonomous navigation along the fresh water supply path, and transmits an autonomous navigation message to each of the autonomous navigation fresh water supply vessels.

10. The system for fresh water supply using a desalination vessel and an autonomous navigation vessel according to claim 1, wherein the vessel server designates one or a plurality of autonomous navigation fresh water supply vessels to be subjected to autonomous navigation based on the fresh water requirement information of the set fresh water supply path, in consideration of topography of each of the islands.

11. The system for fresh water supply using a desalination vessel and an autonomous navigation vessel according to claim 1, wherein the autonomous navigation system and the fresh water supply control system are mounted in the desalination vessel.

* * * * *